United States Patent
Wang

(10) Patent No.: US 12,223,133 B2
(45) Date of Patent: Feb. 11, 2025

(54) METHODS AND APPARATUS FOR PROCESSING OF INPUT EVENTS IN ELECTRONIC DEVICES

(71) Applicant: HUAWEI TECHNOLOGIES CO., LTD., Guangdong (CN)

(72) Inventor: Min Wang, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/247,258

(22) PCT Filed: Aug. 25, 2021

(86) PCT No.: PCT/CN2021/114608
§ 371 (c)(1),
(2) Date: Mar. 29, 2023

(87) PCT Pub. No.: WO2022/068477
PCT Pub. Date: Apr. 7, 2022

(65) Prior Publication Data
US 2023/0367415 A1    Nov. 16, 2023

(30) Foreign Application Priority Data
Sep. 30, 2020  (CN) .......................... 202011065797.5

(51) Int. Cl.
G06F 3/0488  (2022.01)
G06F 3/041   (2006.01)
G06F 9/451   (2018.01)

(52) U.S. Cl.
CPC .......... *G06F 3/0416* (2013.01); *G06F 3/0488* (2013.01); *G06F 9/451* (2018.02)

(58) Field of Classification Search
CPC ....... G06F 3/0416; G06F 3/0488; G06F 9/451
See application file for complete search history.

(56) References Cited

U.S. PATENT DOCUMENTS

| | | | |
|---|---|---|---|
| 8,487,896 B1* | 7/2013 | Brown | G06F 3/0418 345/173 |
| 2014/0152590 A1* | 6/2014 | Brown | G06F 3/0418 345/173 |
| 2014/0204036 A1* | 7/2014 | Schillings | G06F 3/0418 345/173 |
| 2015/0355774 A1* | 12/2015 | Johansson | G06F 3/04166 345/173 |
| 2016/0357429 A1* | 12/2016 | Nilo | G06F 3/0416 |

FOREIGN PATENT DOCUMENTS

| | | |
|---|---|---|
| CN | 104660777 B | 6/2017 |
| WO | 2018233636 A1 | 12/2018 |

OTHER PUBLICATIONS

Extended European Search Report in European Appln No. 21874138.7, dated Feb. 15, 2024, 8 pages.

* cited by examiner

*Primary Examiner* — Adam J Snyder
(74) *Attorney, Agent, or Firm* — Fish & Richardson P.C.

(57) ABSTRACT

Example event processing methods and apparatus are described. In one example method, after an electronic device receives a first target vertical synchronization signal, if an input event received by the electronic device is a target input event and meets a preset condition, the target input event is processed before a second target vertical synchronization signal arrives. The second target vertical synchronization signal is a next target vertical synchronization signal of the first target vertical synchronization signal.

15 Claims, 10 Drawing Sheets

METHODS AND APPARATUS FOR PROCESSING OF INPUT EVENTS IN ELECTRONIC DEVICES

CROSS-REFERENCE TO RELATED APPLICATIONS

This application is a National Stage of International Application No. PCT/CN2021/114608, filed on Aug. 25, 2021, which claims priority to Chinese Patent Application No. 202011065797.5, filed on Sep. 30, 2020, both of which are hereby incorporated by reference in their entireties.

TECHNICAL FIELD

Embodiments of this application relate to the field of terminal technologies, and in particular, to an event processing method and a device.

BACKGROUND

Usually, an electronic device displays an image on a screen of the electronic device by performing processing such as drawing, rendering, image frame composition, and image frame displaying. In the conventional technology, as shown in FIG. 1A, drawing processing may be divided into four steps, including: input (input) processing 1, animation (animation) processing 2, traversal (traversal) processing 3, and callback (callback) processing 4.

In an Android (Android) system, an input event in a touchscreen interaction process may include a screen touch action ACTION_DOWN event, a slide action ACTION_MOVE event, a hand lifting action ACTION_UP event, and the like. If determining that a received input event is an ACTION_MOVE event, the electronic device caches the input event. One or more layers corresponding to the cached input event are drawn (that is, input processing, animation processing, traversal processing, and callback processing are sequentially performed) only after a next target vertical synchronization signal (such as VSYNC_APP) arrives. Then, processing such as rendering, image frame composition, and image frame displaying is performed on the one or more layers.

When the ACTION_MOVE event is processed by using a solution in the conventional technology, the electronic device needs to wait for arrival of a vertical synchronization signal 1. This may cause a delay when the ACTION_MOVE event is processed (that is, when one or more layers corresponding to the ACTION_MOVE event start to be drawn), leading to a long response time of screen sliding interaction.

SUMMARY

Embodiments of this application provide an event processing method and a device. An electronic device may process a target input event in advance, and does not need to wait for a next target vertical synchronization signal to arrive before processing the target input event, thereby reducing a delay in processing the target input event by the electronic device and a response time of screen sliding interaction.

To achieve the foregoing objective, the following technical solutions are used in embodiments of this application.

According to a first aspect, an embodiment of this application provides an event processing method, applied to an electronic device. The method may include: After a first target vertical synchronization signal is received, if an input event received by an electronic device is a target input event and meets a preset condition, the electronic device processes the target input event before a second target vertical synchronization signal arrives. The second target vertical synchronization signal is a next target vertical synchronization signal of the first target vertical synchronization signal.

In the method of this application, when a received target input event meets the preset condition, the electronic device may process the target input event before the second target vertical synchronization signal arrives. In this way, the electronic device may process a collected target input event in advance, without waiting for arrival of a second target vertical synchronization signal before the collected target input event is processed, thereby reducing a delay of the electronic device and a response time of screen sliding interaction, and ensuring sliding sensitivity.

With reference to the first aspect, in a possible design, the preset condition includes: a first time period corresponding to the target input event is less than a minimum reporting period of an input event. The first time period indicates a time period between a moment at which the target input event is received and a moment at which the second target vertical synchronization signal arrives.

In other words, that the target input event received by the electronic device meets the preset condition means that a time difference between the moment at which the electronic device receives the target input event and the moment at which the second target vertical synchronization signal arrives is less than the minimum reporting period of an input event. In this way, before the second target vertical synchronization signal arrives, the electronic device no longer receives a target input event. Therefore, it can be ensured that a target input event to be processed after arrival of the second target vertical synchronization signal has been collected, and the electronic device may process the target input event in advance.

With reference to the first aspect, in another possible design, processing the target input event includes: drawing one or more layers corresponding to the target input event.

With reference to the first aspect, in another possible design, processing the target input event further includes: processing another target input event received in a second time period. The second time period indicates a time period between a moment at which the first target vertical synchronization signal is received and a moment at which the target input event is received. In other words, when the preset condition is met, in addition to processing the target input event, the electronic device also processes another target input event received after the first target vertical synchronization signal is received and before the target input event is received.

With reference to the first aspect, in another possible design, processing the target input event does not include: calculating the first time period corresponding to the target input event.

With reference to the first aspect, in another possible design, the method further includes: if the input event received by the electronic device is the target input event and does not meet the preset condition, receiving a next input event.

With reference to the first aspect, in another possible design, the target input event may be a slide action event.

According to a second aspect, this application provides an electronic device, including a touchscreen, a memory, and one or more processors. The touchscreen, the memory, and the processor are coupled. The memory is configured to store computer program code, the computer program code includes computer instructions, and when the processor executes the computer instructions, the electronic device is enabled to perform: after a first target vertical synchronization signal is received, if a received input event is a target input event and meets a preset condition, processing the target input event before a second target vertical synchronization signal arrives. The second target vertical synchronization signal is a next target vertical synchronization signal of the first target vertical synchronization signal.

With reference to the second aspect, in a possible design, the preset condition includes: A first time period corresponding to the target input event is less than a minimum reporting period of an input event. The first time period indicates a time period between a moment at which the target input event is received and a moment of the second target vertical synchronization signal.

With reference to the second aspect, in another possible design, processing the target input event includes: drawing one or more layers corresponding to the target input event.

With reference to the second aspect, in another possible design, processing the target input event further includes: processing another target input event received in a second time period. The second time period indicates a time period between a moment of the first target vertical synchronization signal and a moment at which the target input event is received.

With reference to the second aspect, in another possible design, the electronic device further performs: if the input event received by the electronic device is the target input event and does not meet the preset condition, receiving a next input event.

With reference to the second aspect, in another possible design, the target input event is a slide action event.

According to a third aspect, this application provides a chip system, including one or more interface circuits and one or more processors. The interface circuit and the processor are interconnected by using a line. The interface circuit is configured to receive a signal from a memory of the electronic device and send the signal to the processor, where the signal includes computer instructions stored in the memory. When the processor executes the computer instructions, the electronic device performs the method according to any one of the first aspect and the possible designs of the first aspect.

According to a fourth aspect, this application provides a computer storage medium, including computer instructions. When the computer instructions are run on an electronic device, the electronic device is enabled to perform the method according to any one of the first aspect and the possible designs of the first aspect.

According to a fifth aspect, this application provides a computer program product. When the computer program product runs on a computer, the computer is caused to perform the method according to any one of the first aspect and the possible designs of the first aspect.

It may be understood that for beneficial effects that can be achieved by the electronic device according to the second aspect, the chip system according to the third aspect, the computer storage medium according to the fourth aspect, and the computer program product according to the fifth aspect, reference may be made to beneficial effects in any of the first aspect and the possible designs of the first aspect. Details are not described herein again.

DESCRIPTION OF EMBODIMENTS

The following describes the technical solutions in embodiments of this application with reference to the accompanying drawings in embodiments of this application. In the descriptions of embodiments of this application, unless otherwise specified, "/" means "or". For example, A/B may indicate A or B. In this specification, "and/or" merely describes an association relationship between associated objects and indicates that three relationships may exist. For example, A and/or B may indicate the following three cases: only A exists, both A and B exist, and only B exists. In addition, in the descriptions of embodiments of this application, "a plurality of" means two or more.

The terms "first" and "second" hereinafter are merely used for the purpose of description, and shall not be understood as an indication or implication of relative importance or implicit indication of a quantity of indicated technical features. Therefore, a feature defined by "first" or "second" may explicitly or implicitly include one or more of such features. In the descriptions of embodiments, unless otherwise specified, "a plurality of" means two or more.

An embodiment of this application provides an event processing method, which may be applied to an electronic device. When a received input (input) event is a target input event, such as a slide action ACTION_MOVE event, whether the target input event can be processed in advance, that is, whether one or more layers corresponding to the target input event can be immediately drawn may be determined based on a minimum reporting period and a screen refresh period of the input event. If the target input event may be processed in advance, the electronic device immediately processes the target input event, without waiting for the receipt of a vertical synchronization signal 1 before processing the target input event. In this way, a response delay of the electronic device and a response time of screen sliding interaction may be reduced, and problems in the conventional technology that a delay caused by processing the target input event only after receiving the vertical synchronization signal 1 is relatively long, a response time of screen sliding interaction is relatively long, and sliding sensitivity is affected are avoided.

Figure 1A:
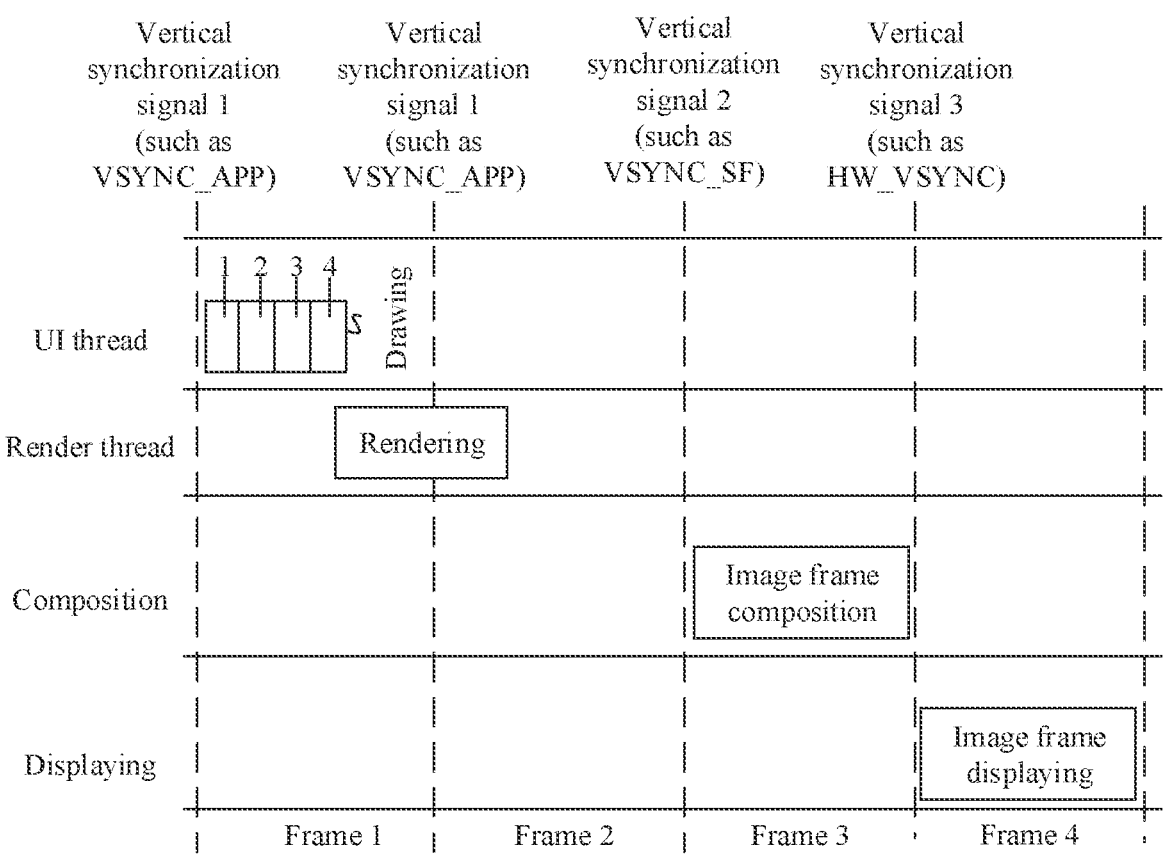
FIG. 1A is a schematic diagram of an image processing process provided.
Figure 1B:
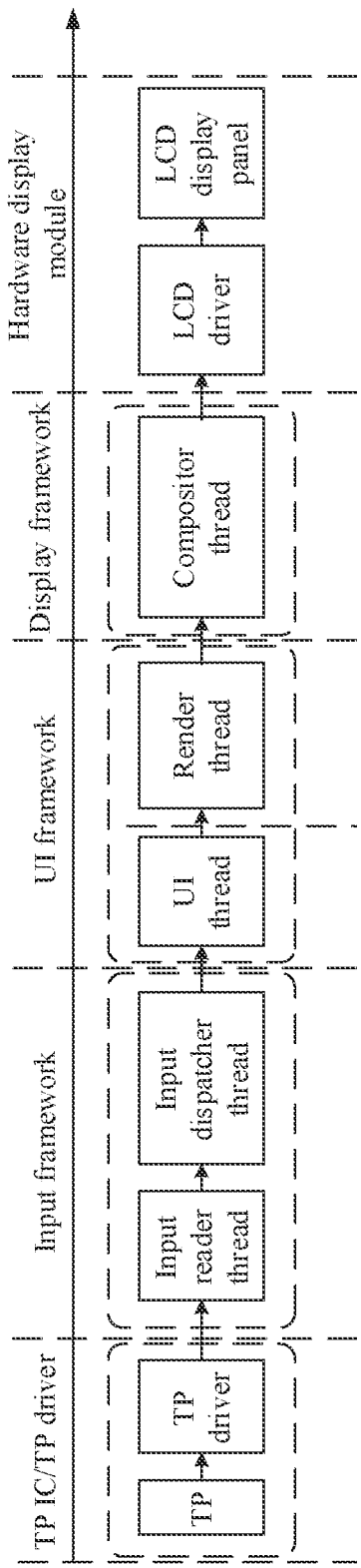
FIG. 1B is a schematic diagram of a software processing procedure of an electronic device provided.

Referring to FIG. 1B, the electronic device may include: a touch panel (touch panel, TP)/TP driver (Driver), an input framework (Input Framework), a UI framework (UI Framework), a display framework (Display Framework), and a hardware display module.

After a TP in a TP IC/TP driver collects a touch operation performed by a user on the TP of the electronic device, the TP driver reports a corresponding touch event. An input reader thread of the input framework may read the touch event, and then send the touch event to an input dispatcher thread. The input dispatcher thread sends and uploads the touch event to a UI thread (such as DoFrame) in the UI framework. The UI thread in the UI framework draws one or more layers corresponding to the touch event. A render thread renders the one or more layers. A compositor thread in the display framework performs layer composition on one or more of the rendered layers to obtain an image frame. A liquid crystal display panel (Liquid Crystal Display, LCD) driver of a hardware display module may receive a composite image frame, and the LCD displays the composite image frame. After the LCD displays the image frame, the image displayed by the LCD may be perceived by human eyes.

With reference to FIG. 1A, a vertical synchronization signal that appears in a process in which an electronic device displays an image on a touchscreen in response to a touch operation of a user on the touchscreen is described.

A vertical synchronization signal 1 (such as VSYNC_APP) may be used to trigger drawing of one or more layers. In this embodiment of this application, that the vertical synchronization signal 1 may be used to trigger drawing of one or more layers specifically means that the vertical synchronization signal 1 may trigger drawing of the one or more layers, and trigger rendering of the one or more layers. In other words, the one or more drawn layers are the one or more rendered layers. It should be noted that, if the drawing of the one or more layers is not completed within one signal period of the vertical synchronization signal 1, that is, the drawing times out, the electronic device performs the foregoing uncompleted drawing process when a next vertical synchronization signal 1 arrives. As shown in FIG. 1A, in this case, a frame drop phenomenon may occur due to a drawing timeout.

A vertical synchronization signal 2 (such as VSYNC_SF) may be used to trigger layer composition performed on the one or more drawn layers to obtain an image frame. After completing the drawing of the one or more layers in response to the vertical synchronization signal 1, the electronic device may perform layer composition on the one or more layers (the one or more rendered layers) in response to the vertical synchronization signal 2.

A vertical synchronization signal 3 (such as HW_VSYNC) may be used to trigger hardware to refresh and display the image frame. After completing image frame composition in response to the vertical synchronization signal 2, the electronic device may display the image frame in response to the vertical synchronization signal 3.

With reference to FIG. 1A and FIG. 1B, in response to the touch operation of the user or when a UI event occurs on the electronic device, the UI framework may invoke, at a moment when the vertical synchronization signal 1 arrives, the UI thread to draw one or more layers corresponding to the touch event (that is, an input event), and then invoke the render thread to render the one or more layers. Then, the compositor thread in the Display framework may invoke, at a moment when the vertical synchronization signal 2 arrives, the compositor thread to perform layer composition on the one or more drawn layers (that is, the one or more rendered layers) to obtain the image frame. Finally, the hardware display module may refresh and display the image frame on an LCD (that is, a display, where the LCD is used as an example herein) at a moment when the vertical synchronization signal 3 arrives. The UI event may be triggered by the touch operation performed by the user on the TP. Alternatively, the UI event may be automatically triggered by the electronic device. For example, when a foreground application of the electronic device automatically switches an image, the foregoing UI event may be triggered. The foreground application is an application corresponding to a screen currently displayed on the display of the electronic device.

It should be noted that the UI framework periodically performs layer drawing and rendering based on the vertical synchronization signal 1; the Display framework periodically performs layer composition based on the vertical synchronization signal and the hardware display module periodically performs image frame refreshing and displaying based on the vertical synchronization signal 3.

The vertical synchronization signal 3 is a hardware signal triggered by a display driver of the electronic device, and a signal period T3 of the vertical synchronization signal 3 is determined based on a screen refresh rate of the display of the electronic device. That is, the signal period T3 of the vertical synchronization signal 3 is equal to the screen refresh period of the display of the electronic device. Specifically, the signal period T3 of the vertical synchronization signal 3 is a reciprocal of the screen refresh rate of the display of the electronic device.

For example, the screen refresh rate of the display of the electronic device may be any value of 60 hertz WA 70 Hz, 75 Hz, 80 Hz, or the like. An example in which the screen refresh rate is 60 Hz is used. The signal period of the vertical synchronization signal 3 is $T3=\frac{1}{60}=0.01667$ seconds (s)=16.667 milliseconds (ms). It should be noted that the electronic device may support a plurality of different screen refresh rates. For example, it is assumed that a maximum screen refresh rate supported by the electronic device is 80 Hz. In this case, the electronic device may support a screen refresh rate of 80 Hz, 60 Hz, 40 Hz, or the like. The screen refresh rate in this embodiment of this application is a screen refresh rate currently used by the electronic device. That is, the signal period T3 of the vertical synchronization signal 3 is a reciprocal of the screen refresh rate currently used by the electronic device.

The vertical synchronization signal 1 and the vertical synchronization signal 2 are generated based on the vertical synchronization signal 3. Usually, the vertical synchronization signal 1 and the vertical synchronization signal 2 are synchronized with the vertical synchronization signal 3. In other words, the vertical synchronization signal 1 and the vertical synchronization signal 2 have a same signal period and a same phase as the vertical synchronization signal 3. It may be understood that, in an actual implementation process, there may be a phase error between the vertical synchronization signal 1, the vertical synchronization signal 2, and the vertical synchronization signal 3 due to various factors (such as processing performance). It should be noted that the foregoing phase error is ignored when the method in this embodiment of this application is understood.

Figure 1C:
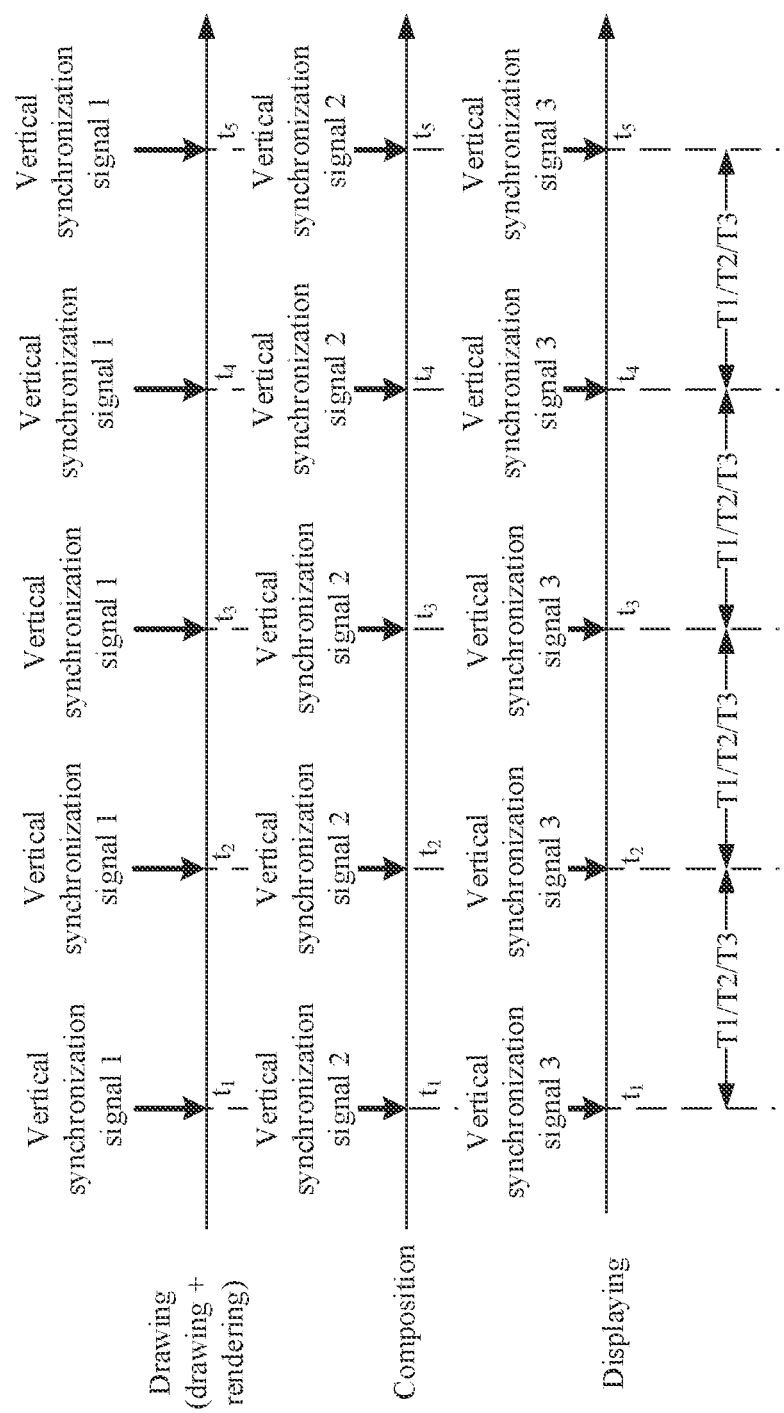
FIG. 1C is a schematic diagram in which signal periods of vertical synchronization signals are the same.

In this embodiment of this application, as shown in FIG. 1C, the vertical synchronization signal 1, the vertical synchronization signal 2, and the vertical synchronization signal 3 are all periodic discrete signals, and signal periods of the vertical synchronization signal 1, the vertical synchronization signal 2, and the vertical synchronization signal 3 may be referred to as a synchronization period $T_Z$. That is, $T1=T2=T3=T_Z$. A frame 1, frame 2, frame 3, and frame 4 shown in FIG. 1A are all the synchronization periods.

The TP is a touch panel, and the TP may be integrated into the display. The TP may periodically detect the touch operation of the user. After detecting the touch operation, the TP may wake up the vertical synchronization signal 1 and the vertical synchronization signal 2, to trigger the UI framework to perform layer drawing and rendering based on the vertical synchronization signal 1, and trigger the Display framework to perform layer composition based on the vertical synchronization signal 2. A period in which the TP periodically detects the touch operation of the user may be referred to as a reporting period of the input event. In this embodiment of this application, a minimum reporting period of the input event is a minimum value of the reporting period of the input event. For example, the minimum reporting period of the input event is usually a fixed value less than $T_Z$.

The event processing method provided in this embodiment of this application may be applied to an electronic device such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in this embodiment of this application.

Figure 2:
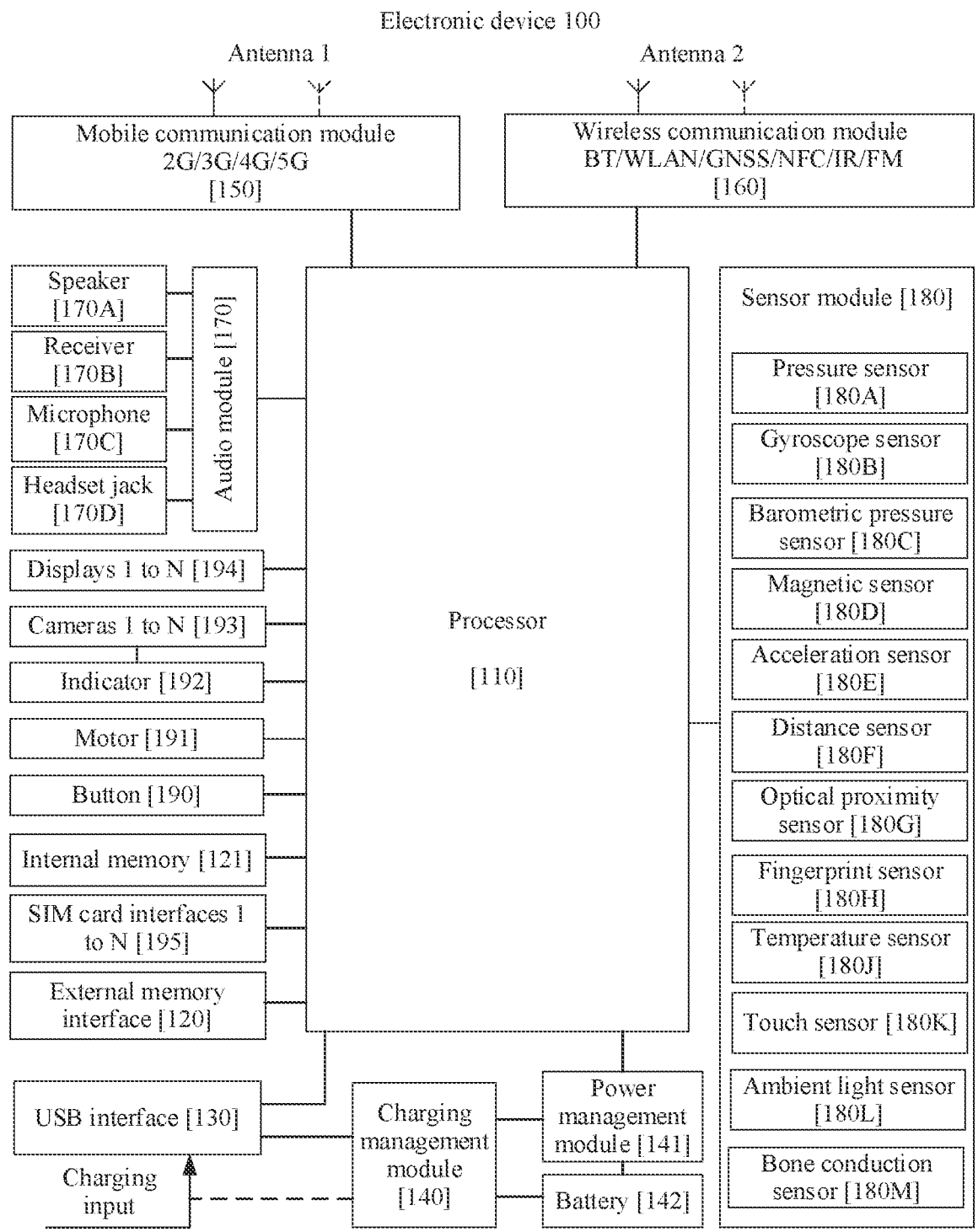
FIG. 2 is a schematic diagram of a hardware structure of an electronic device according to an embodiment of this application.

For example, FIG. 2 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a ballet), 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180O, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of this application does not constitute a specific limitation on the electronic device 100. In some other embodiments of this application, the electronic device 100 may include more or fewer components than those shown in the figure, or may have some components combined or split, or may have a different arrangement of the components. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a timing signal, to implement control on instruction fetching and execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access and reduces a waiting time of the processor 110, thereby improving efficiency of a system. In some embodiments, when a received target input event does not meet a condition for processing in advance, the electronic device 100 may cache the received target input event in the memory, and process the cached target input event when a vertical synchronization VSYNC signal arrives or when a preset condition is met.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPM) interface, a subscriber identity module (subscriber identity module, SIM) interface, a universal serial bus (universal serial bus, USB) port, and/or the like.

It may be understood that an interface connection relationship between the modules illustrated in this embodiment of this application is merely an illustrative description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a wireless communication solution that is applied to the electronic device 100 and that includes 2G/3G/4G/5G or the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 may be disposed in the same device as at least some modules of the processor 110.

The wireless communication module 160 may provide a wireless communication solution that is applied to the electronic device 100, and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, TR) technology, or the like. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite based augmentation systems, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a shooting function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The digital signal processor is configured to process a digital signal, and may process another digital signal in addition to the digital image signal. For example, when the electronic device 100 selects a frequency, the digital signal processor is configured to perform Fourier transform on energy at that frequency.

The video codec is configured to compress or decompress a digital video. The electronic device 100 may support one or more types of video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. The NPU may implement applications such as intelligent cognition of the electronic device 100, for example, image recognition, facial recognition, speech recognition, and text understanding.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code which includes instructions. The processor 110 performs various function applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the electronic device 100. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement an audio function such as music playing and recording through the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal. In some embodiments, the pressure sensor 180E may be disposed in the display 194. There are a plurality of types of pressure sensors 180A, such as a resistive pressure sensor, an inductive pressure sensor, and a capacitive pressure sensor. The capacitive pressure sensor may include at least two parallel plates having conductive materials. When a force is applied to the pressure sensor 180A, a capacitance between electrodes changes. The electronic device 100 determines a strength of the pressure based on changes in the capacitance. When a touch operation is performed on the display 194, the electronic device 100 detects a strength of the touch operation through the pressure sensor 180A. The electronic device 100 may also calculate a touch position based on a detection signal of the pressure sensor 180A. In some embodiments, touch operations that are performed at a same touch position but have different touch operation strengths may correspond to different operation instructions.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of an input event corresponding to the touch operation. A visual output related to the touch operation may be provided through the display 194. In some other embodiments, the touch sensor 180K may alternatively be disposed on a surface of the electronic device 100 at a position different from that of the display 194. In this embodiment of this application, the touch sensor 180K may detect a touch operation perforated on or near the display, for example, a screen touch action ACTION_DOWN, a slide action ACTION_MOVE, or a hand lifting action ACTION_UP. The touch sensor 180K may transfer the detected touch operation to the application processor. If an input event corresponding to the touch operation is the target input event, such as the ACTION_MOVE event, when determining that the target input event meets the preset condition, the electronic device may immediately process the collected target input event and provide a related visual output through the display 194, without having to wait for the reception of a vertical synchronization signal 1 before the target input event is processed, thereby reducing a response delay and ensuring sliding sensitivity.

Figure 3:
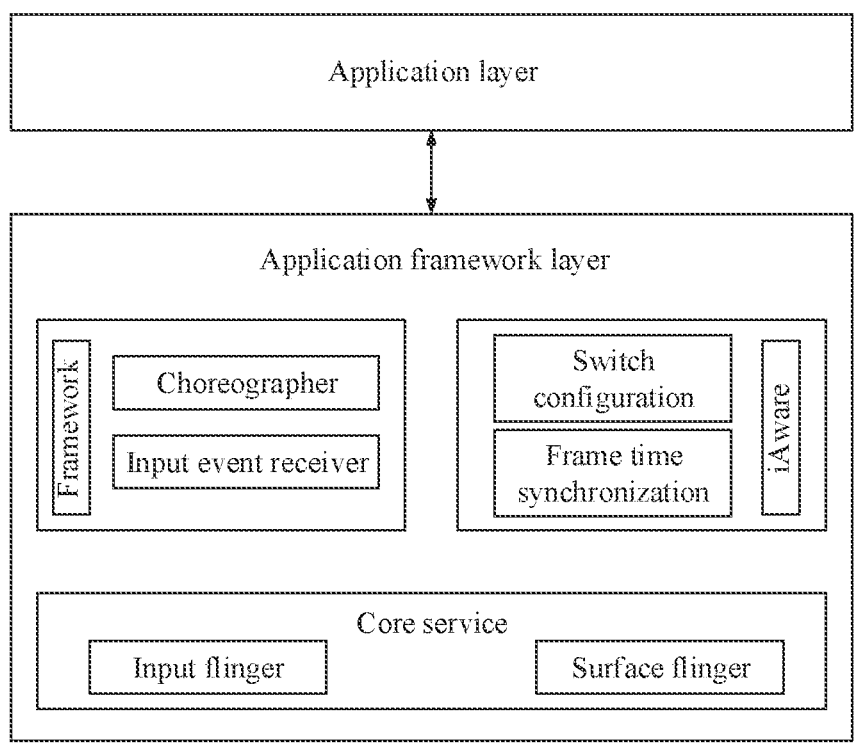
FIG. 3 is a schematic diagram of a software structure of an electronic device according to an embodiment of this application.

FIG. 3 is a block diagram of a software structure of the electronic device 100 according to an embodiment of this application. It should be noted that FIG. 3 shows only architectures of an application layer and an application framework layer that run in a virtual machine. The electronic device 100 may further include an Android runtime (Android runtime), a system library, a kernel layer, and the like, which is not limited in this application, Each layer has a clear role and responsibility, and the layers communicate with each other through a software interface.

The application layer may include a series of application packages. For example, the application packages may include applications such as Camera, Gallery, Calendar, Phone, Map, Navigation, WLAN, Bluetooth, Music, Videos, and Messages. The application layer may further process a plurality of input events, such as an ACTION_DOWN event, an ACTION_MOVE event or an ACTION_UP event.

The application framework layer provides an application programming interface (application programming interface, API) and a programming framework for an application at the application layer. The application framework layer includes some predefined functions.

As shown in FIG. 3, the application framework layer may include a Framework module, an iAware module, a core service module, and the like.

The iAware module may include a switch configuration module and a frame time synchronization module. The iAware module is used to configure a minimum reporting period T_input and a screen refresh period $T_Z$ of an input event. For example, the electronic device 100 may statically configure the minimum reporting period T_input of the input event by enabling the switch configuration module in the iAware module. For another example, the frame time synchronization module in the iAware module may obtain the screen refresh period $T_Z$, that is, a period of the vertical synchronization signal 1. The frame time synchronization module may further calculate a time t_vsync of a next vertical synchronization signal 1 based on the screen refresh period.

The Framework module may include a Choreographer module and an InputEventReceiver module. The Framework module is configured to: determine a type of an input event, and after determining that the input event is a target input event, such as the ACTION_MOVE event, determine whether the target input event can be processed in advance, that is, determine whether one or more layers corresponding to the target input event can be immediately drawn, without waiting for arrival of the next target vertical synchronization signal 1 before the target input event is processed.

For example, the InputEventReceiver module in the Framework module may obtain the minimum reporting period of the input event from the iAware module. The Choreographer module in the Framework module may obtain the screen refresh period and a time of the next vertical synchronization signal 1 from the frame time synchronization module, and send the screen refresh period and the time of the next vertical synchronization signal 1 to the InputEventReceiver module.

If the InputEventReceiver module determines that the current input event is the target input event, such as the ACTION_iMOVE event, the InputEventReceiver module may determine, based on the minimum reporting period of the input event, the time of the next vertical synchronization signal 1, and a timestamp t_input of the target input event, whether to process the target input event in advance, that is, whether to immediately draw the one or more layers corresponding to the target input event. It may be understood that the timestamp of the target input event indicates an input moment of the target input event.

The core service module may include an inputflinger module and a surfacetlinger module. The core service module includes an internal service program of the electronic device 100. The inputflinger module is configured to receive various input operations. For example, the inputflinger module may receive various touch operations (touch operations of a user or touch operations performed by using a touch device), and then receive a corresponding input event. The surfaceflinger module is used to provide a corresponding visual output. For example, the surfaceflinger module may provide a related visual output by using a display based on the input event.

In this embodiment of this application, referring to FIG. 3, after determining that the target input event can be processed in advance, the InputEventReceiver module at the application framework layer sends a determined result to the application layer, and the application layer invokes a CPU, a GPU, or the like to process the target input event. For example, one or more layers corresponding to the target input event are drawn, then layer composition is performed on the one or more layers, and finally an image frame is displayed.

Figure 4:
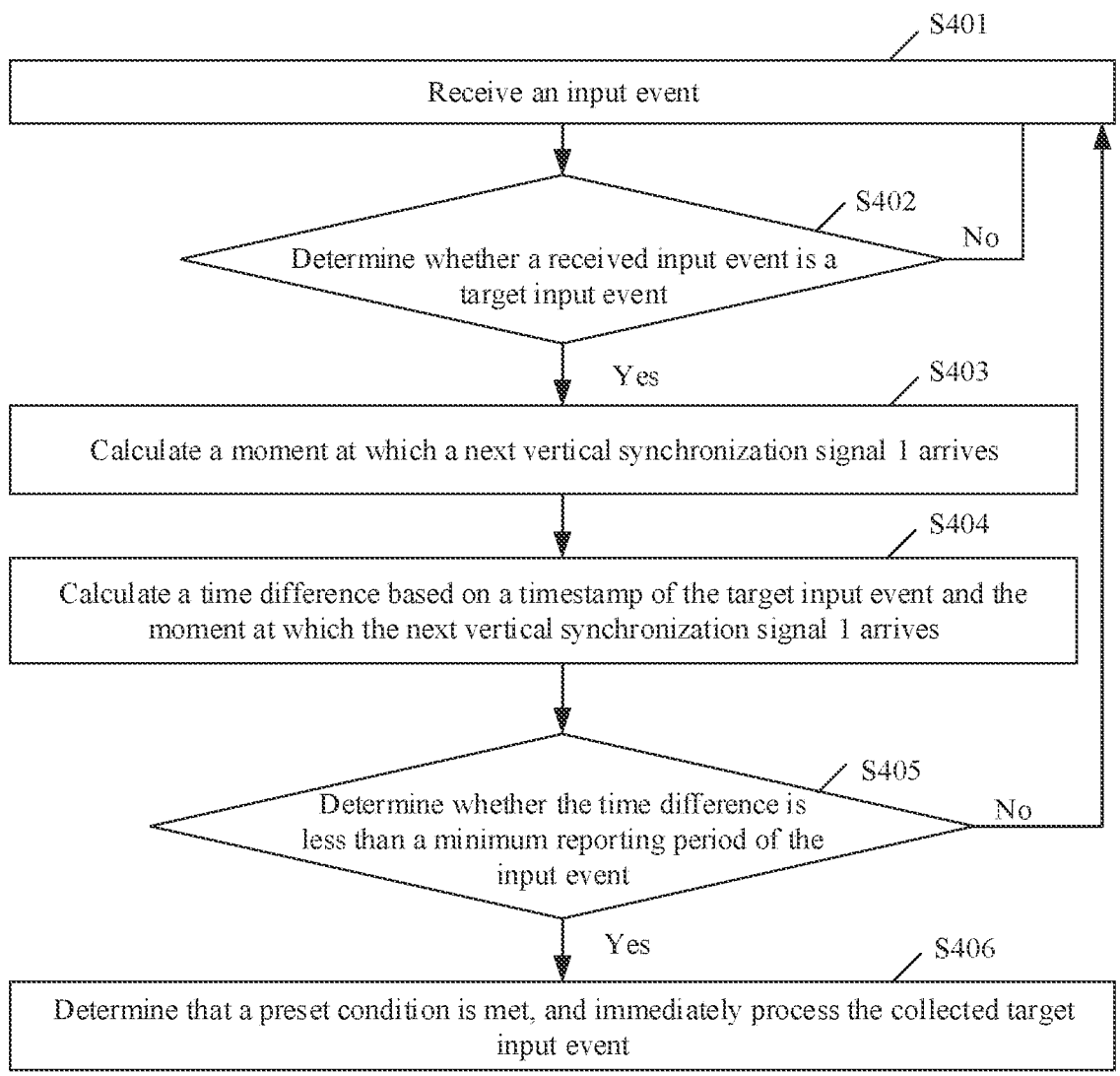
FIG. 4 is a schematic flowchart of an event processing method according to an embodiment of this application.

For ease of understanding, the following embodiment of this application describes an event processing method provided in this embodiment of this application in detail with reference to FIG. 4 by using an example in which an electronic device is a mobile phone having the structures shown in FIG. 2 and FIG. 3. As shown in FIG. 4, the event processing method includes the following steps.

S401: A mobile phone receives an input event.

When a user performs touchscreen interaction with the mobile phone, the mobile phone may receive a plurality of touchscreen operations input by the user by using a touch object such as a finger or a stylus, for example, a slide action ACTION_MOVE, a screen touch action ACTION_DOWN, or a hand lifting action ACTION_UP. In some embodiments, one complete touchscreen interaction may include one ACTION_DOWN, a plurality of ACTION_MOVE, and one ACTION_UP.

The mobile phone may receive different input events based on different touchscreen operations. For example, the input event may include an ACTION_MOVE event, an ACTION_DOWN event, an ACTION_UP event, or the like.

Figure 5:
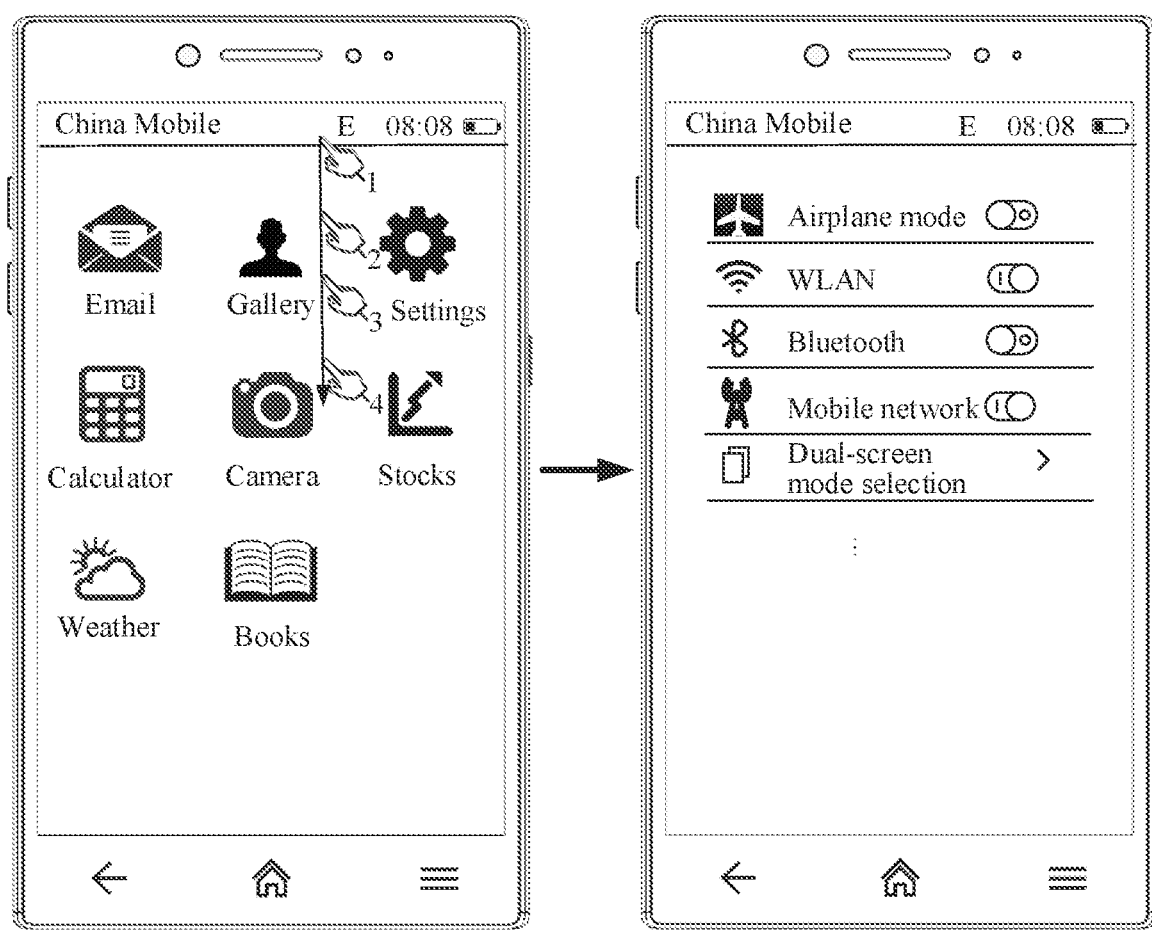
FIG. 5 is a schematic diagram of a screen for touchscreen interaction according to an embodiment of this application.

For example, as shown in FIG. 5, the user performs touchscreen interaction with the mobile phone, so that the mobile phone displays a drop-down notification bar. At a position 1, a screen touch operation of the user is ACTION_DOWN, and correspondingly, the mobile phone may receive an ACTION_DOWN event. In a slide-down process, for example, at a position 2 and a position 3, a screen touch operation of the user is ACTION_MOVE, and correspondingly, the mobile phone may receive an ACTION_MOVE event. At a position 4, a screen touch operation of the user is ACTION_UP, and correspondingly, the mobile phone may receive an ACTION_UP event. The mobile phone displays the drop-down notification bar through touchscreen interaction between the user and the mobile phone.

S402: The mobile phone determines Whether the received input event is a target input event.

After receiving the input event, the mobile phone may determine a type of the input event, to determine whether the received input event is the target input event.

In the conventional technology, the target input event indicates an input event that can be processed only after a next vertical synchronization signal 1 arrives. For example, the target input event may be the ACTION_MOVE event.

If determining that the received input event is the target input event, the mobile phone may determine whether the target input event meets a preset condition. If the preset condition is met, the mobile phone may process the target input event in advance. In other words, the mobile phone may process the target input event before the next vertical synchronization signal 1 arrives. For example, the mobile phone draws one or more layers corresponding to the target input event before the next vertical synchronization signal 1 arrives, without waiting for arrival of the next vertical synchronization signal 1 before the target input event is processed. If the preset condition is not met, the mobile phone may store the current target input event, and continue to receive a next input event.

In some embodiments, the preset condition includes: A time difference between a timestamp of the target input event and a moment at which the next vertical synchronization signal 1 arrives is less than a minimum reporting period of the input event. In other words, the mobile phone may determine, based on the timestamp of the target input event, the moment at which the next vertical synchronization signal 1 arrives, and the minimum reporting period of the input event, whether the target input event meets the preset condition.

In a possible implementation, that the mobile phone determines whether the target input event meets the preset condition may include the following steps.

S403. If determining that the received input event is the target input event, the mobile phone calculates the moment at which the next vertical synchronization signal 1 arrives.

If determining that the received input event is not the target input event, the mobile phone continues to receive a next input event.

A time of the next vertical synchronization signal 1 is the moment at which the mobile phone receives the next vertical synchronization signal 1. The mobile phone may calculate, based on a screen refresh period, the moment at which the next vertical synchronization signal 1 arrives. Specifically, the moment at which the next vertical synchronization signal 1 arrives is equal to a moment at which a current vertical synchronization signal 1 arrives plus the screen refresh period $T_Z$.

Figure 6:
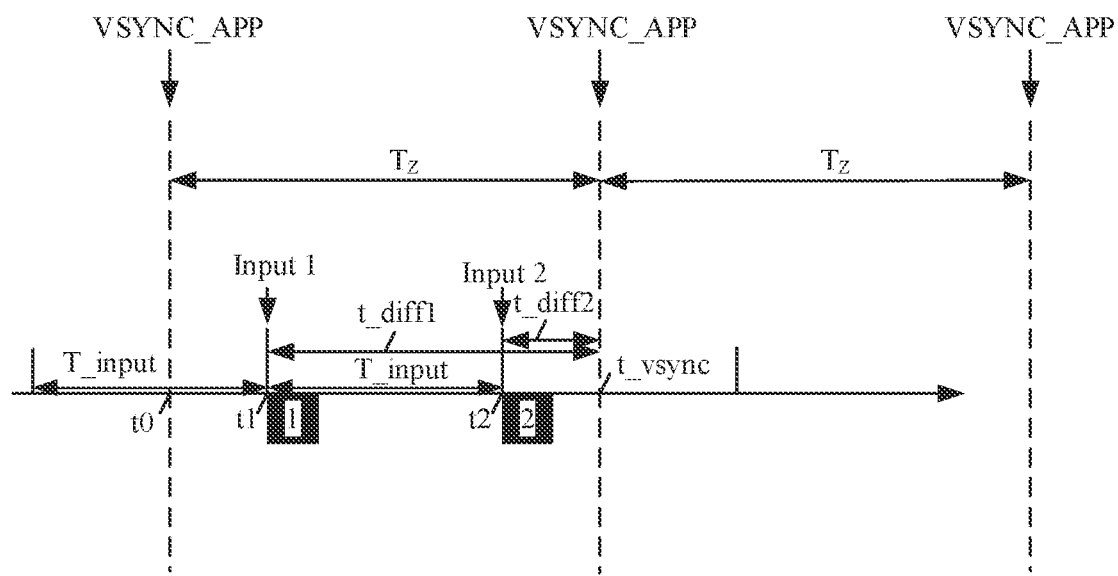
FIG. 6 is a schematic diagram of an event processing method according to an embodiment of this application.

For example, as shown in FIG. 6, if the moment at which the current vertical synchronization signal 1 arrives is t0, the moment at which the next vertical synchronization signal 1 arrives is $t\_vsync=t0+T_Z$.

The screen refresh period $T_Z$ indicates a display switching, time of an image displayed on a screen. For example, if the screen refresh period is 16.6 ms, that is, the screen refresh rate is 60 Hz, it indicates that 60 images are displayed per second. If the screen refresh period is 8.33 ms, that is, the screen refresh period is 120 Hz, 120 images are displayed per second. A duration of the screen refresh period is not limited in this embodiment of this application.

It may also be considered that the screen refresh period is a refresh period of a VSYNC signal, that is, a time difference between two VSYNC signals.

The screen refresh period may be preset in the mobile phone, or may be set by the user in the mobile phone as required. A setting occasion and a setting manner of the screen refresh period are not limited in this embodiment of this application.

In some embodiments, the mobile phone may obtain the screen refresh period $T_Z$ after determining that the received input event is the target input event. In some other embodiments, the mobile phone may alternatively obtain the screen refresh period $T_Z$ before step S402. An occasion for obtaining the screen refresh period $T_Z$ by the mobile phone is not limited in this embodiment of this application, provided that the screen refresh period $T_Z$ is obtained before the moment at which the next vertical synchronization signal 1 arrives is calculated.

S404: The mobile phone calculates a time difference based on the timestamp of the target input event and the moment at which the next vertical synchronization signal 1 arrives.

A timestamp t_input of an input event indicates a moment at which the mobile phone receives the input event. If the input event is the target input event, a timestamp of the target input event indicates a moment at which the mobile phone receives the target input event.

In some embodiments, in step S401, when receiving an input event, the mobile phone may obtain the timestamp of the input event. Then, if it is determined that the input event is the target input event, the timestamp of the input event obtained by the mobile phone is a timestamp of the target input event. In some other embodiments, the mobile phone may obtain a timestamp of the target input event after determining that the input event is the target input event. It should be noted that an occasion for obtaining the timestamp of the target input event by the mobile phone is not limited in this embodiment of this application, provided that the mobile phone obtains the timestamp of the target input event before step S404.

For example, as shown in FIG. 6, if an input moment of a target input event 1 (input1) is t1, a timestamp of the target input event 1 is t1. If an input moment of a target input event 2 (input2) is t2, a timestamp of the target input event 2 is t2.

In this embodiment of this application, a time difference indicates a difference between the moment at which the next vertical synchronization signal 1 arrives and the timestamp of the target input event.

Still as shown in FIG. 6, if the target input event is the target input event 1, a timestamp of the target input event is t1, and a corresponding time difference is t_diff1=t_vsync−t1. If the target input event is the target input event 2, a timestamp of the target input event is t2, and a corresponding time difference is t_diff2=t_vsync−t2.

S405: The mobile phone determines whether the time difference is less than the minimum reporting period of the input event.

The minimum reporting period T_input of the input event indicates a minimum period in which the mobile phone periodically collects and detects a touch operation (that is, a corresponding input event) after receiving the touch operation of the user. As shown in FIGS. 6, t1 and t2 are separated by the minimum reporting period of an input event. A duration of the minimum reporting period of the input event is not limited in this embodiment of this application. Usually, the minimum reporting period of the input event is less than the screen refresh period $T_Z$.

Optionally, the minimum reporting period of the input event may be preconfigured in the mobile phone, or may be set by the user in the mobile phone as required. A setting occasion and a setting manner of the minimum reporting period of the input event are not limited in this application.

In some embodiments, the mobile phone may obtain the minimum reporting period of the input event when receiving the input event. In some other embodiments, the mobile phone may alternatively obtain the minimum reporting period of the input event after determining that the received input event is the target input event. An occasion for obtaining the minimum reporting period of the input event is not limited in this embodiment of this application, provided that the minimum reporting period of the input event is obtained before step S405.

After obtaining the time difference through calculation, the mobile phone may determine a magnitude relationship between the time difference and the minimum reporting period of the input event, to determine whether the time difference is less than the minimum reporting period of the input event. In other words, the mobile phone determines whether the current input event meets the preset condition.

S406: If the time difference is less than the minimum reporting period of the input event, the mobile phone determines that the preset condition is met, and the mobile phone immediately processes a collected target input event.

In this embodiment of this application, that the mobile phone processes the collected target input event in advance indicates that the mobile phone may immediately process the collected target input event, that is, process the collected target input event before the next vertical synchronization signal 1 arrives, without waiting for arrival of a next vertical synchronization signal 1 before the collected target input event is processed. Processing the collected target input events means drawing one or more layers corresponding to these target input events.

If the time difference is not less than the minimum reporting period of the input event, the mobile phone continues to receive a next input event.

In some of embodiments of this application, if the time difference is not less than the minimum reporting period of the input event, the mobile phone may further receive a next target input event before a next vertical synchronization signal 1 arrives. The mobile phone may further receive a target input event before a next vertical synchronization signal 1 arrives. Therefore, the mobile phone cannot determine that all target input events to be processed after the next vertical synchronization signal 1 arrives have been collected. In this way, the mobile phone does not process the collected target input event in advance, but continues to receive a next input event, that is, performs step S401 until the received input event is the target input event and the target input event meets the preset condition. In other words, the mobile phone performs step S401 until a time difference between a timestamp of the target input event and a time of the next vertical synchronization signal 1 is less than the minimum reporting period of the input event.

For example, as shown in FIG. 6, the time difference corresponding to the target input event 1 is t_diff1=t_vsync−t1, and t_diff1>T_input, which means that the mobile phone may further receive the next input event before the next vertical synchronization signal 1 arrives, and that the next input event may be the target input event. The mobile phone may further receive a target input event before a next vertical synchronization signal 1 arrives. Therefore, the mobile phone cannot determine that all target input events to be processed after the next vertical synchronization signal 1 arrives have been collected. In this case, the mobile phone does not process the collected target input event in advance, such as the target input event 1, but continues to receive a next input event until the received next input event is the target input event and meets the preset condition. In other words, the mobile phone processes the collected target input event only when the time difference between the timestamp of the target input event and the next vertical synchronization signal 1 is less than the minimum reporting period of the input event.

In some other embodiments of this application, if the time difference is less than the minimum reporting period of the input event, the mobile phone may receive a next input event only after a next vertical synchronization signal 1 arrives. A time at which the next input event is received is later than a time at which the next vertical synchronization signal 1 arrives. Therefore, the mobile phone may determine that all target input events to be processed after the next vertical synchronization signal 1 arrives have been collected. In other words, when the preset condition is met, the mobile phone may immediately process the collected target input event (draw one or more layers corresponding to the target input event), that is, process the collected target input event before the next vertical synchronization signal 1 arrives, without waiting for arrival of the next vertical synchronization signal 1 before the collected target input event is processed, to process the target input event in advance, that is, perform input processing 1 shown in FIG. 1A in advance.

For example, as shown in FIG. 6, the time difference corresponding to the target input event 2 is t_diff2=t_vsync t2. Because t_diff2<T_input, the mobile phone cannot receive the input event before the next vertical synchronization signal 1 arrives. Therefore, it may be considered that all target input events to be processed when the next vertical synchronization signal 1 arrives have been collected, and the mobile phone may immediately process the collected target input events, such as the target input event 1 and the target input event 2, without waiting for arrival of the next vertical synchronization signal 1 before the collected target input events are processed.

According to the event processing method provided in this embodiment of this application, the mobile phone can process the collected target input event in advance when determining that the received target input event meets the preset condition, without waiting for arrival of the next vertical synchronization signal 1 before the collected target input event is processed, thereby reducing a delay of the mobile phone and a response time of screen sliding interaction, and ensuring sliding sensitivity.

In addition, the collected target input event is processed in advance, that is, the processing 1 shown in FIG. 1A is processed in advance, so that image drawing efficiency can be improved, and a possibility of timeout (exceeding one screen refresh period) in an image drawing and rendering process can be reduced, thereby increasing a frame rate and reducing a possibility of frame dropping. Especially when a screen refresh rate is relatively high, that is, when a drawing time requirement for each frame is higher, for example, when the screen refresh rate reaches 90 Hz or even 120 Hz, an occurrence of frame dropping can be effectively avoided.

The foregoing describes the event processing method provided in embodiments of this application from a perspective of a device by using a mobile phone as an example. The following describes, based on the structure shown in FIG. 3, an event processing method provided in embodiments of this application from a perspective of modules of an electronic device.

Figure 7:
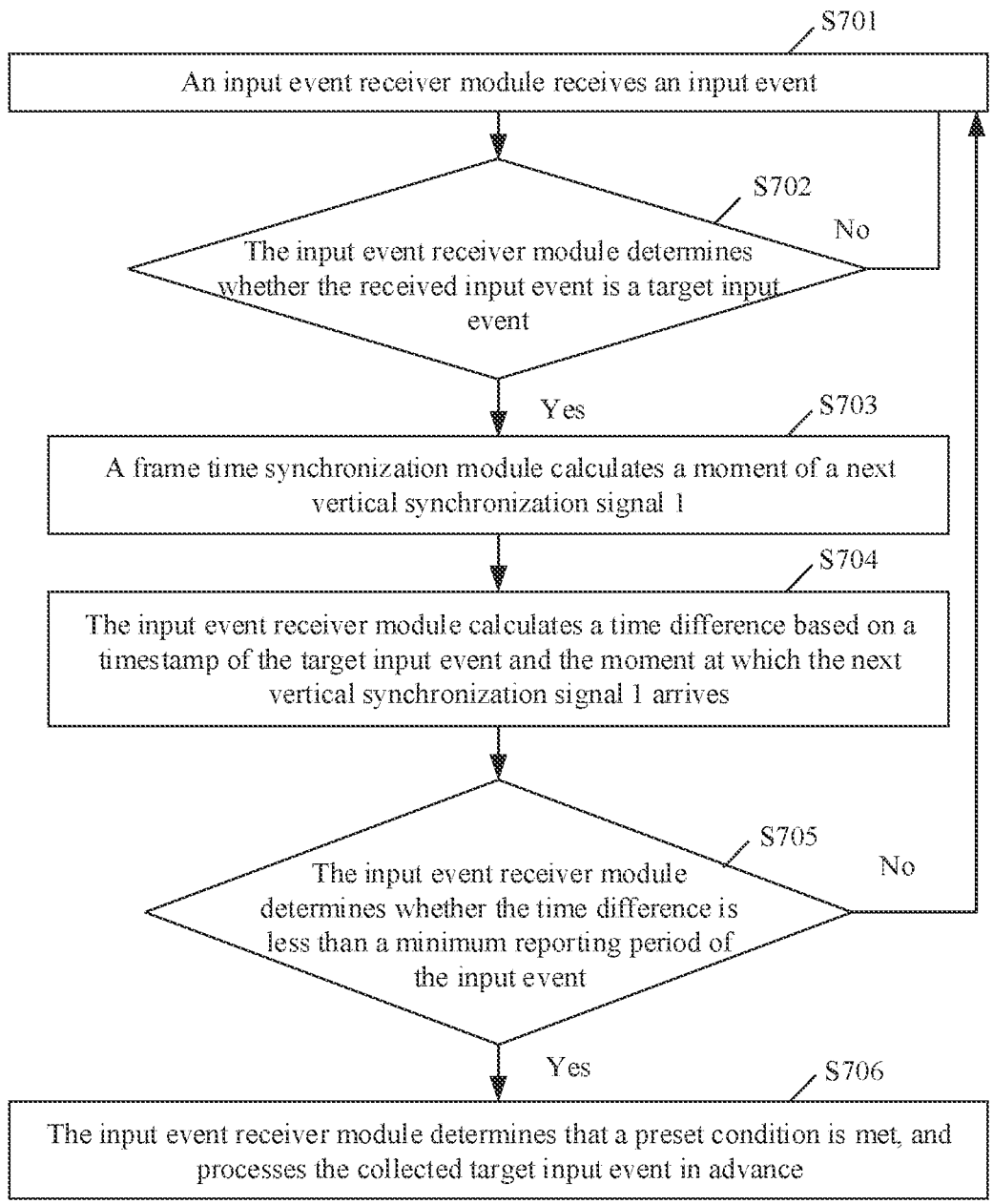
FIG. 7 is another schematic flowchart of an event processing method according to an embodiment of this application.

As shown in FIG. 7, the event processing method provided this embodiment of this application includes the following steps.

S701: An InputEventReceiver module receives an input event.

In step S401, specifically, the mobile phone receives the input event by using the InputEventReceiver module.

The InputEventReceiver module may receive different input events. For example, the input event may include an ACTION_MOVE event, an ACTION_DOWN event, an ACTION_UP event, or the like.

S702: The InputEventReceiver module determines whether the received input event is a target input event.

In step S402, specifically, the mobile phone determines whether the received input event is a target input event by using the InputEventReceiver module.

If the InputEventReceiver module determines that the received input event is the target input event, for example, the ACTION_MOVE event, the InputEventReceiver module may determine whether the target input event meets a preset condition. If the preset condition is met, the InputEventReceiver module may immediately process the collected target input event, that is, send the collected target input event to an application layer for drawing processing, without waiting for arrival of a next vertical synchronization signal 1 before the target input events is processed. If the preset condition is not met, the InputEventReceiver module may store the current target input event, and continue to receive a next input event.

The preset condition includes: A time difference between a timestamp of the target input event and a moment at which the next vertical synchronization signal 1 arrives is less than a minimum reporting period of the input event. In other words, the InputEventReceiver module may determine, based on the timestamp of the target input event, the moment at which the next vertical synchronization signal 1 arrives, and the minimum reporting period of the input event, whether the target input event meets the preset condition.

In some embodiments, that the InputEventReceiver module determines whether the target input event meets the preset condition may include the following steps.

S703: If the InputEventReceiver module determines that the received input event is the target input event, a frame time synchronization module calculates the moment at which the next vertical synchronization signal 1 arrives.

If the InputEventReceiver module determines that the received input event is not the target input event, the InputEventReceiver module continues to receive a next input event.

The frame time synchronization module may calculate, based on a screen refresh period $T_z$, the moment t_vsync at which the next vertical synchronization signal 1 arrives. Specifically, the moment at which the next vertical synchronization signal 1 arrives is equal to a moment at which a current vertical synchronization signal 1 arrives plus the screen refresh period.

In this embodiment of this application, the screen refresh period is obtained by the frame time synchronization module. The frame time synchronization module may obtain the screen refresh period after the InputEventReceiver module determines that the received input event is the target input event. Alternatively, the frame time synchronization module may obtain the screen refresh period before the InputEventReceiver module performs step S702. An occasion for obtaining the screen refresh period by the frame time synchronization module is not limited in this embodiment of this application, provided that the screen refresh period is obtained before the frame time synchronization module calculates the moment at which the next vertical synchronization signal 1 arrives.

S704: The InputEventReceiver module calculates the time difference based on the timestamp of the target input event and the moment at which the next vertical synchronization signal 1 arrives.

A timestamp t_input of an input event indicates a moment at which the InputEventReceiver module receives the input event.

In some embodiments, when receiving an input event, the InputEventReceiver module may obtain a timestamp of the input event. Then, if the InputEventReceiver module determines that the input event is the target input event, the timestamp of the input event obtained by the InputEventReceiver module is the timestamp of the target input event. In some other embodiments, the InputEventReceiver module may obtain the timestamp of the target input event after determining that the input event is the target input event. It should be noted that an occasion for obtaining the timestamp of the target input event by the InputEventReceiver module is not limited in this embodiment of this application, provided that the InputEventReceiver module obtains the timestamp of the target input event before performing step S704.

The InputEventReceiver module may obtain the screen refresh period and the moment at which the next vertical synchronization signal 1 arrives from the frame time synchronization module by using a Choreographer module.

In this embodiment of this application, the time difference indicates a difference between the moment at which the next vertical synchronization signal 1 arrives and the timestamp of the target input event.

S705: The InputEventReceiver module determines whether the time difference is less than the minimum reporting period of the input event.

In this embodiment of this application, the minimum reporting period of the input event is configured by a switch configuration module. For example, the switch configuration module may statically configure the minimum reporting period of the input event according to a configuration file.

Optionally, the switch configuration module may configure the minimum reporting period T_input of the input event in advance, or may configure the minimum reporting period of the input event based on a user requirement. An occasion for configuring the minimum reporting period of the input event by the switch configuration module is not limited in this application.

The InputEventReceiver module may obtain the minimum reporting period of the input event from the switch configuration module.

In some embodiments, the InputEventReceiver module may obtain the minimum reporting period of the input event when receiving the input event. In some other embodiments, the Input-Even-Receiver module may alternatively obtain the minimum reporting period of the input event after determining that the received input event is the target input event. An occasion for obtaining the minimum reporting period of the input event by the InputEventReceiver module is not limited in this embodiment of this application, provided that the minimum reporting period of the input event is obtained before step S705.

After obtaining the time difference through calculation, the InputEventReceiver module may determine a magnitude relationship between the time difference and the minimum reporting period of the input event, to determine whether the time difference is less than the minimum reporting period of the input event. That is, the InputEventReceiver module determines whether the current input event meets the preset condition.

S706: If the time difference is less than the minimum reporting period of the input event, the InputEventReceiver module determines that the preset condition is met, and the InputEventReceiver module processes the collected target input event in advance.

In this embodiment of this application, that the InputEventReceiver module processes the collected target input event in advance indicates that the Input:Even-Receiver module may immediately process the collected target input event, that is, process the collected target input event before the next vertical synchronization signal 1 arrives, without waiting for arrival of the next vertical synchronization signal 1 before the collected target input event is processed. Processing the collected target input event means drawing one or more layers corresponding to the collected target input event.

If the time difference is not less than the minimum reporting period of the input event, the InputEventReceiver module continues to receive a next input event.

In this embodiment of this application, when the InputEventReceiver module immediately processes the collected target input event, the InputEventReceiver module sends the collected target input event to the application layer for subsequent processing such as drawing. For example, the application layer invokes a GPU, a CPU, and the like to perform processing such as drawing, rendering, image frame composition, and image frame displaying.

According to the event processing method provided in this embodiment of this application, when the received target input event meets the preset condition, the InputEventReceiver module can process the collected target input event in advance (draw one or more layers corresponding to the collected target input event), without waiting for arrival of the next vertical synchronization signal 1 before the collected target input event is processed, thereby reducing a delay of the mobile phone and a response time of screen sliding interaction, and ensuring sliding sensitivity. In addition, the collected target input event is processed in advance, so that image drawing efficiency can be further improved, and a possibility of timeout (exceeding one screen refresh period) in an image drawing and rendering process can be reduced, thereby improving a frame rate and reducing a possibility of frame dropping.

Figure 8:
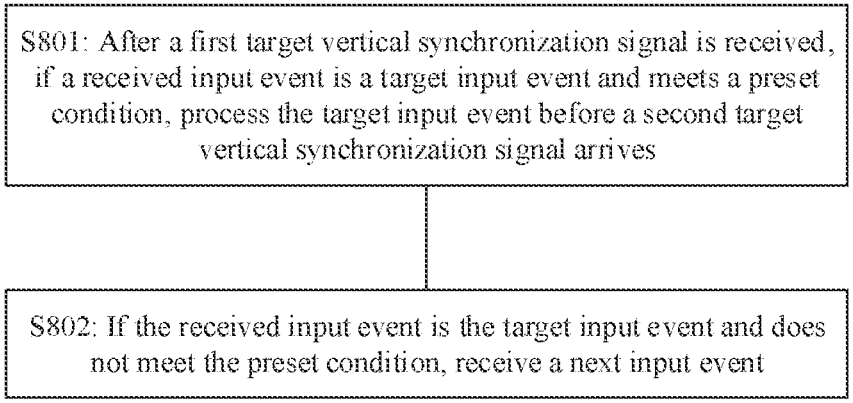
FIG. 8 is another schematic flowchart of an event processing method according to an embodiment of this application.

An embodiment of this application further provides an event processing method. As shown in FIG. 8, a mobile phone is taken as an example of the execution body. The event processing method includes the following steps.

S801: After a first target vertical synchronization signal is received, if an input event received by a mobile phone is a target input event and meets a preset condition, the mobile phone processes the target input event before a second target vertical synchronization signal arrives.

The second target vertical synchronization signal is a next target vertical synchronization signal of the first target vertical synchronization signal.

In some embodiments, the target vertical synchronization signal is a vertical synchronization signal 1. In the conventional technology, the target input event indicates an input event that can be processed only after a next vertical synchronization signal 1 arrives. For example, the target input event may be an ACTION_MOVE event.

In some embodiments, that the mobile phone processes the target input event includes: The mobile phone draws one or more layers corresponding to the target input event. In other words, in this embodiment of this application, that the mobile phone processes the target input event specifically means that the mobile phone draws one or more layers corresponding to the target input event, to perform subsequent processes of image frame composition and image frame displaying.

In some embodiments, that the mobile phone processes the target input event further includes: The mobile phone processes another target input event received in a second time period. The second time period indicates a time period between a moment at which the mobile phone receives the first target vertical synchronization signal and a moment at which the mobile phone receives the target input event. To be specific, in this embodiment of this application, the mobile phone may further process another target input event received within the time period between the moment at which the mobile phone receives the first target vertical synchronization signal and the moment at which the mobile phone receives the target input event.

In some embodiments, the preset condition specifically includes: The first time period corresponding to the target input event is less than a minimum reporting period of an input event. The first time period herein indicates a time period between a moment at which the mobile phone receives the target input event and a moment at which the second target vertical synchronization signal arrives. In other words, the preset condition includes: A time difference between a timestamp of the target input event and a moment at which the next vertical synchronization signal 1 arrives is less than the minimum reporting period of the input event.

If the received input event is the target input event and meets the preset condition, the mobile phone may process the target input event in advance. That is, the mobile phone processes the target input event before the next vertical synchronization signal 1 arrives. For example, before the next vertical synchronization signal 1 arrives, the mobile phone draws one or more layers corresponding to the target input event.

Herein, step S801 may be corresponding to the method procedure of the foregoing steps S401 to S406.

If the received target input event does not meet the preset condition, the event processing method further includes step S802.

S802: If the input event received by the mobile phone is the target input event and does not meet the preset condition, the mobile phone receives a next input event.

This step corresponds to a case in which "the time difference is not less than the minimum reporting period of the input event" in the foregoing step S405.

If the received input event is the target input event and does not meet the preset condition, it indicates that the time difference between the timestamp of the target input event and the moment at which the next vertical synchronization signal 1 arrives is greater than or equal to the minimum reporting period of the input event. In this case, the mobile phone may further receive the target input event before the next vertical synchronization signal 1 arrives. Therefore, it cannot be considered that all target input events to be processed after the next vertical synchronization signal 1 arrives have been collected. In this way, the mobile phone continues to receive a next input event.

According to the event processing method provided in this embodiment of this application, the mobile phone can process the collected target input event in advance when determining that the received target input event meets the preset condition, without waiting for arrival of the next vertical synchronization signal 1 before the collected target input event is processed, thereby reducing a delay of the mobile phone and a response time of screen sliding interaction, and ensuring sliding sensitivity.

In addition, the collected target input event is processed in advance, that is, the processing 1 shown in FIG. 1A is processed in advance, so that image drawing efficiency can be improved, and a possibility of timeout (exceeding one screen refresh period) in an image drawing and rendering process can be reduced, thereby increasing a frame rate and reducing a possibility of frame dropping. Especially when a screen refresh rate is relatively high, that is, when a drawing time requirement for each frame is higher, for example, when the screen refresh rate reaches 90 Hz or even 120 Hz, an occurrence of frame dropping can be effectively avoided.

For example, in a test scenario, as shown in Table 1, when a user taps a recent (recent) key on a screen of the mobile phone to enter a recent task, an event processing method in the conventional technology is used, and the process takes 9,313 μs on average. How-ever, if the event processing method provided in this embodiment of this application is used, this process requires only 6,429 μs on average, and a response time is reduced by 30.97%. It can be seen that the event processing method provided in this embodiment of this application can effectively reduce a response time for the user to tap the recent key to enter the recent task.

For another example, in another test scenario, as shown in Table 1, when the user slides to enter a next screen of an application in a process of using the application, if the event processing method in the conventional technology is used, it takes 7,361 μs on average for the mobile phone to display the next screen. However, if the event processing method provided in this embodiment of this application is used, it takes 5,873 μs on average for the mobile phone to display the next screen, and a response time is reduced by 20.62%. It can be seen that the event processing method provided in this embodiment of this application can effectively reduce a response time of sliding by the user to enter the next display screen of the application. In conclusion, the event processing method provided in this embodiment of this application can effectively reduce a response time of screen sliding interaction and ensure sliding sensitivity.

TABLE 1

| Test scenario | Conventional technology (AVG) | This method (AVG) | Optimization ratio |
| --- | --- | --- | --- |
| Tap a recent key to enter a recent task | 9,313 μs | 6,429 μs | 30.97% |
| Slide on a screen of an application | 7,361 μs | 5,873 μs | 20.62% |

In addition, when the user slides to enter a next screen of an application in a process of using the application, if the event processing method in the conventional technology is used, 22 frames out of 144 frames of images are lost, and a frame loss rate is 0.152778. However, if the event processing method provided in this embodiment of this application is used, 4 frames out of 157 frames of images are lost, a frame loss rate is 0.025478, and a frame loss ratio is reduced by 12.73%. It can be learned that the event processing method provided in this embodiment of this application can effectively improve a frame rate, and reduce a possibility of frame dropping. In addition, in still another test scenario, when an application runs in the background, if the event processing method provided in this embodiment of this application is used, an average drawing time of the application may be optimized from 9.3 ms to 6.5 ms, and the average drawing time is optimized by 30%. It can be seen that the event processing method provided in this embodiment of this application can reduce an application drawing time, which further indicates that the application of the event processing method provided in this application embodiment can increase the frame rate and reduce the possibility of frame dropping.

It may be understood that, to implement the foregoing functions, the electronic device includes a hardware structure and/or a software module for performing a corresponding function. In combination with algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person of ordinary skill in the art may use different methods to implement the described functions for each particular application, but it should not be considered that the implementation goes beyond the scope of this application.

In this embodiment, the electronic device may be divided into function modules based on the foregoing method examples. For example, each function module may be obtained through division based on each corresponding function, or two or more functions may be integrated into one processing module. The integrated module may be implemented in a form of hardware. It should be noted that, in this embodiment of this application, module division is an example, and is merely a logical function division. In actual implementation, another division manner may be used.

Figure 9:
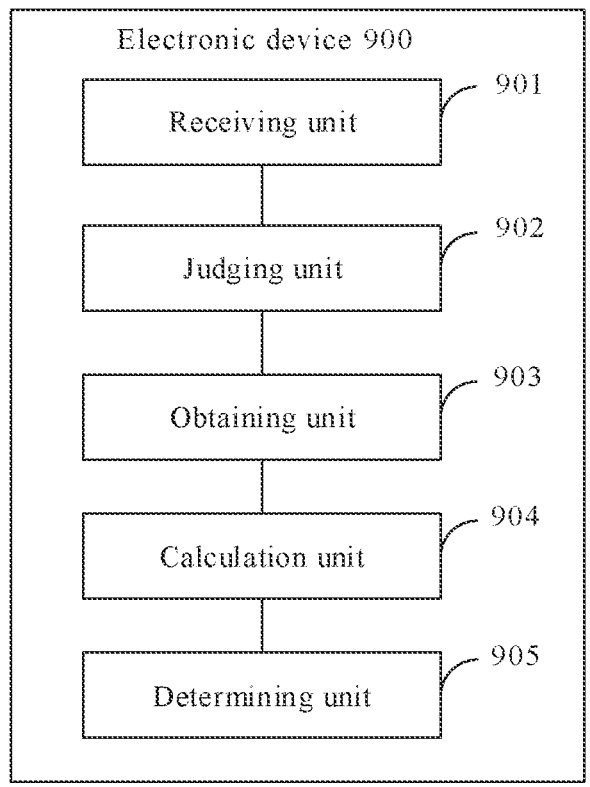
FIG. 9 is a schematic diagram of a structure of an electronic device according to an embodiment of this application.

For example, FIG. 9 is a schematic diagram of a structure of an electronic device according to an embodiment of this application. As shown in FIG. 9, this embodiment of this application provides an electronic device 900, including a receiving unit 901, a judging unit 902, an obtaining unit 903, a calculation unit 904, and a determining unit 905.

The receiving unit 901 is configured to perform step S401 and step S701. The judging unit 902 is configured to perform step S402, step S405, step S702, and step S705. The obtaining unit 903 is configured to obtain a screen refresh period, a reporting period of an input event, and a time stamp of the input event. The calculation unit 904 is configured to perform step S403, step S404, step S703, and step S704. The determining unit 905 is configured to perform step S406 and step S706.

An embodiment of this application further provides a computer-readable storage medium. The computer readable-storage medium stores a computer program. When the computer program is run on an electronic device, the electronic device is enabled to perform the foregoing related method steps, to implement the event processing method for the electronic device in the foregoing embodiment.

An embodiment of this application further provides a computer program product. When the computer program product is run on an electronic device, an electronic device is enabled to perform the foregoing related steps, to implement the event processing method for the electronic device performed by the electronic device in the foregoing embodiment.

In addition, an embodiment of this application further provides an apparatus. The apparatus may be specifically a chip, a component, or a module. The apparatus may include a processor and a memory that are connected. The memory is configured to store computer executable instructions. When the apparatus runs, the processor may execute the computer executable instructions stored in the memory, to enable the chip to perform the event processing method for the electronic device performed by the electronic device in the foregoing method embodiment.

The electronic device, the computer-readable storage medium, the computer program product, or the chip provided in embodiments of this application is configured to perform the corresponding methods provided above. Therefore, for beneficial effects that can be achieved by the electronic device, the computer-readable storage medium, the computer program product, or the chip, reference may be made to beneficial effects in the corresponding methods provided above. Details are not described herein.

Through description of the foregoing implementations, persons skilled in the art may understand that, for convenience and conciseness of description, only the division of the foregoing function modules is used as an example for description. In actual application, the foregoing functions may be allocated to and completed by different function modules as required, that is, an internal structure of the apparatus is divided into different function modules to complete all or some of the functions described above.

In the several embodiments provided in this application, it should be understood that the disclosed apparatus and methods may be implemented in other manners. For example, the described apparatus embodiment is merely an example. For example, the module or unit division is merely logical function division, and may be other division in actual implementation.

For example, a plurality of units or components may be combined or may be integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of steps of the methods described in embodiments of this application. The foregoing storage medium includes any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An event processing method applied to an electronic device, wherein the event processing method comprises:
   receiving a first target vertical synchronization signal;
   receiving an input event;
   processing, in response to the input event being a target input event and meeting a preset condition, the target input event, wherein the preset condition comprises:
      a first time period corresponding to the target input event is less than a minimum reporting period of an input event, wherein the first time period indicates a time period between a moment at which the target input event is received and a moment at which a second target vertical synchronization signal arrives; and
   receiving the second target vertical synchronization signal, wherein the second target vertical synchronization signal is a next target vertical synchronization signal of the first target vertical synchronization signal.

2. The event processing method according to claim 1, wherein the processing the target input event comprises:
   drawing, based on the first target vertical synchronization signal, one or more layers corresponding to the target input event.

3. The event processing method according to claim 1, further comprising:
   processing another target input event received in a second time period, wherein the second time period indicates a time period between a moment at which the first target vertical synchronization signal is received and a moment at which the target input event is received.

4. The event processing method according to claim 1, further comprising:
   when the input event is the target input event and does not meet the preset condition, receiving a next input event.

5. The event processing method according to claim 1, wherein the target input event comprises a slide action event.

6. An electronic device, comprising:
   at least one processor; and
   one or more memories coupled to the at least one processor and storing programming instructions for execution by the at least one processor to perform operations comprising:
      receiving a first target vertical synchronization signal;
      receiving an input event;
      processing, in response to the input event being a target input event and meeting a preset condition, the target input event, wherein the preset condition comprises:
         a first time period corresponding to the target input event is less than a minimum reporting period of an input event, wherein the first time period indicates a time period between a moment at which the target input event is received and a moment at which a second target vertical synchronization signal arrives; and
      receiving the second target vertical synchronization signal, wherein the second target vertical synchronization signal is a next target vertical synchronization signal of the first target vertical synchronization signal.

7. The electronic device according to claim 6, wherein the processing the target input event comprises:
   drawing one or more layers corresponding to the target input event.

8. The electronic device according to claim 6, wherein the one or more memories store the programming instructions for execution by the at least one processor to perform operations comprising:
   processing another target input event received in a second time period, wherein the second time period indicates a time period between a moment at which the first target vertical synchronization signal is received and a moment at which the target input event is received.

9. The electronic device according to claim 6, wherein the one or more memories store the programming instructions for execution by the at least one processor to perform operations comprising:
   when the input event is the target input event and does not meet the preset condition, receiving a next input event.

10. The electronic device according to claim 6, wherein the target input event comprises a slide action event.

11. A non-transitory computer-readable storage medium storing programming instructions for execution by at least one processor to perform operations comprising:
    receiving a first target vertical synchronization signal;
    receiving an input event;
    processing, in response to the input event being a target input event and meeting a preset condition, the target input event, wherein the preset condition comprises:
       a first time period corresponding to the target input event is less than a minimum reporting period of an input event, wherein the first time period indicates a time period between a moment at which the target input event is received and a moment at which a second target vertical synchronization signal arrives; and
    receiving the second target vertical synchronization signal, wherein the second target vertical synchronization signal is a next target vertical synchronization signal of the first target vertical synchronization signal.

12. The non-transitory computer-readable storage medium according to claim 11, wherein the processing the target input event comprises:
    drawing, based on the first target vertical synchronization signal, one or more layers corresponding to the target input event.

13. The non-transitory computer-readable storage medium according to claim 11, wherein the non-transitory computer-readable storage medium stores the programming instructions for execution by the at least one processor to perform operations comprising:
    processing another target input event received in a second time period, wherein the second time period indicates a time period between a moment at which the first target vertical synchronization signal is received and a moment at which the target input event is received.

14. The non-transitory computer-readable storage medium according to claim 11, wherein the non-transitory computer-readable storage medium stores the programming instructions for execution by the at least one processor to perform operations comprising:
    when the input event is the target input event and does not meet the preset condition, receiving a next input event.

15. The non-transitory computer-readable storage medium according to claim 11, wherein the target input event comprises a slide action event.

* * * * *